United States Patent
Weinstein et al.

(10) Patent No.: US 11,714,838 B2
(45) Date of Patent: Aug. 1, 2023

(54) STRUCTURES MAINTENANCE MAPPER

(71) Applicant: THE BOEING COMPANY, Chicago, IL (US)

(72) Inventors: Sara Weinstein, Vancouver (CA); Christopher Rogers, Tokorozawa (JP)

(73) Assignee: The Boeing Company, Arlington, VA (US)

( * ) Notice: Subject to any disclaimer, the term of this patent is extended or adjusted under 35 U.S.C. 154(b) by 9 days.

(21) Appl. No.: 17/184,072

(22) Filed: Feb. 24, 2021

(65) Prior Publication Data

US 2021/0182321 A1 Jun. 17, 2021

Related U.S. Application Data

(62) Division of application No. 15/940,536, filed on Mar. 29, 2018.

(51) Int. Cl.

| G06F 16/23 | (2019.01) |
| G06F 16/31 | (2019.01) |
| G06F 16/35 | (2019.01) |
| G06F 16/34 | (2019.01) |
| G06F 16/332 | (2019.01) |
| G06F 40/279 | (2020.01) |

(52) U.S. Cl.
CPC ........... *G06F 16/328* (2019.01); *G06F 16/23* (2019.01); *G06F 16/3329* (2019.01); *G06F 16/34* (2019.01); *G06F 16/358* (2019.01); *G06F 40/279* (2020.01)

(58) Field of Classification Search
CPC ........................................... G06F 16/23
USPC ........................................... 707/713
See application file for complete search history.

(56) References Cited

U.S. PATENT DOCUMENTS

| 5,991,699 A | 11/1999 | Kulkarni et al. |
| 8,026,933 B2 * | 9/2011 | Baier .................... G06Q 10/06 345/441 |
| 8,977,620 B1 | 3/2015 | Buryak |

(Continued)

FOREIGN PATENT DOCUMENTS

WO 2011075729 A2 6/2011

OTHER PUBLICATIONS

Extended European Search Report for Application No. P121779EP/GSJ dated Aug. 21, 2019.

(Continued)

*Primary Examiner* — Syling Yen
(74) *Attorney, Agent, or Firm* — Patterson + Sheridan, LLP

(57) ABSTRACT

Systems and methods are provided herein for enabling a computing system to search and interact with service records containing natural language text to aid in the analysis of those records by: displaying in a user interface an image of a complex system; receiving, from the user interface, a high-level selection of criteria of the complex system; querying issue maps associated with individual natural language service records of a corpus of natural language service records based on the high-level selection, wherein the issue maps specify at least one term related to the complex system and a location on the complex system associated with the at least one term; and returning at least one issue map, wherein the at least one issue map returned specifies a term or location correlated to the criteria of the complex system indicated by the high-level selection.

17 Claims, 5 Drawing Sheets

(56) References Cited

U.S. PATENT DOCUMENTS

| | | |
|---|---|---|
| 2003/0078913 A1 | 4/2003 | McGreevy |
| 2007/0179968 A1 | 8/2007 | Fish |
| 2008/0249658 A1 | 10/2008 | Walker et al. |
| 2015/0058006 A1 | 2/2015 | Proux |
| 2015/0088491 A1 | 3/2015 | Fume et al. |
| 2019/0034512 A1* | 1/2019 | Baral .................. G06F 16/287 |

OTHER PUBLICATIONS

European Patent Office Examination Report for Application No. 19162497.2-1231 dated Aug. 3, 2021.
Mynda Treacy: "Excel Map Charts @BULLET My Online Training Hub Excel Map Charts Mar. 16, 2017 by Mindy Treacy", My Online Training Hub, Mar. 16, 2017, pp. 1-34, XP055955037, Retrived from the Internet: URL:https://www.myonlinetraininghub.com/excel-map-charts (retrived on Aug. 25, 2022).
Anonymous: "Excel Map Charts—My Online Training Hub", Mar. 18, 2017, pp. 1-14, XP055955064, Retrieved from the Internet: URL:https://web.archive/org/web/20170318191413/https://www.myonlinetraininghub.coom/excel-map-charts (retrieved on Aug. 25, 2022).
Summons to Attend Oral Proceedings Pursuant to Rule 115(1) EPC for European Patent Application No. 19 162 497.2-1203, dated Sep. 27, 2022, 8 pages.

* cited by examiner

STRUCTURES MAINTENANCE MAPPER

CROSS-REFERENCES TO RELATED APPLICATIONS

The present disclosure is a divisional of U.S. Pat. No. 10,963,491, filed Mar. 29, 2018 titled "STRUCTURES MAINTENANCE MAPPER". The aforementioned related patent application is herein incorporated by reference in its entirety.

FIELD

A of the present disclosure provide for improved computing efficiency in analyzing natural language text documents.

BACKGROUND

The present disclosure relates to natural language text documents, and more specifically, to service records including natural language text. Service records include requests for service, resolutions to the requests for service, and intermediate communications related to the service. For example, an end-user may send a request for service to a technician, who may converse with the end-user to diagnose and address the root cause for the service request before providing a resolution to the service request.

In some aspects, these communications are handled in structured forms, with various fields holding various data (e.g., a part number field holds values identifying parts by part numbers), which can be unwieldy for the end-users, can require specific applications to be used to submit communications, can cause confusion and errors when data are mislabeled, and are only partly effective, as many forms include a "comments" field that includes natural language text. In other aspects, natural language text documents, such as email messages, are used for the service records without (or with minimal) formatting for data fields. As will be appreciated, although freeform text is often simpler for human users to deal with than structured data, the freeform nature of natural language text poses difficulties for computing systems in analyzing the data.

SUMMARY

The present disclosure provides, in one aspect, a method for providing a structures maintenance mapper, comprising: clustering terms in natural language service records of a corpus of natural language service records related to a complex system based on term definitions in a knowledgebase; associating, based on a definition for the complex system that includes a coordinate system that describes the complex system, the clustered terms with the coordinate system for the complex system; generating an issue map for a given natural language service record of the corpus, wherein the issue map identifies the clustered terms in the given natural language service record and associated locations for the clustered terms according to the coordinate system for the complex system; and associating the issue map to the given natural language service record of the corpus.

In one aspect, in combination with any example above or below, when providing a structures maintenance mapper, the given natural language service record is associated with one issue map, and in response to receiving a subsequent message for the given natural language service record, the one issue map is updated.

In one aspect, in combination with any example above or below, a method for providing a structures maintenance mapper further comprises: receiving a query request from an operator device indicating criteria; querying the corpus based on the criteria; and transmitting issue maps that include the criteria as terms or locations to the operator device.

In one aspect, in combination with any example above or below, when providing a structures maintenance mapper, the terms include components of the complex system.

In one aspect, in combination with any example above or below, when providing a structures maintenance mapper, clustering the terms further comprises expanding the terms to include implicit terms, and including the implicit terms in the issue map.

In one aspect, in combination with any example above or below, when providing a structures maintenance mapper, the implicit terms include intermediate locations to a first location explicitly listed in the given natural language service record and a second location explicitly listed in the given natural language service record.

In one aspect, in combination with any example above or below, when providing a structures maintenance mapper, the terms include locations listed according to the coordinate system for the complex system.

In one aspect, in combination with any example above or below, when providing a structures maintenance mapper, the definition for the complex system includes multiple coordinate systems for the complex system, and wherein associating the clustered terms with the coordinate system for the complex system based on the definition for the complex system further comprises associating the clustered terms with the multiple coordinate systems.

In one aspect, in combination with any example above or below, when providing a structures maintenance mapper, the terms include client identifiers, date identifiers, and issue type identifiers.

The present disclosure provides in another aspect, a method for providing a structures maintenance mapper, comprising: displaying in a user interface an image of a complex system; receiving, from the user interface, a high-level selection of criteria of the complex system; querying issue maps associated with individual natural language service records of a corpus of natural language service records based on the high-level selection, wherein the natural language service records of the corpus are uniquely associated with one issue map, wherein the issue maps specify at least one term related to the complex system and a location on the complex system associated with the at least one term; and returning at least one issue map, wherein the at least one issue map returned specifies a term or location correlated to the criteria of the complex system indicated by the high-level selection.

In one aspect, in combination with any example above or below, when providing a structures maintenance mapper, returning the at least one issue map further comprises: overlaying a chart onto the image of the complex system, wherein the chart displays data in the at least one issue map at locations correlated to the image of the complex system.

In one aspect, in combination with any example above or below, when providing a structures maintenance mapper, the at least one issue map includes locations correlated the complex system in a first coordinate system and in a second coordinate system correlated with the first coordinate system.

In one aspect, in combination with any example above or below, when providing a structures maintenance mapper, the method further comprises: displaying a second image of the complex system associated with the second coordinate system; overlaying a second chart onto the second image of the complex system, wherein the second chart displays the data in the at least one issue map at locations correlated to the second image of the complex system according to the second coordinate system; wherein the image of the complex system is associated with the first coordinate system; and wherein the chart is overlaid onto the image of the complex system according to the first coordinate system.

In one aspect, in combination with any example above or below, when providing a structures maintenance mapper, the method further comprises: receiving a filtering input specifying additional criteria; removing any issue maps from the at least one issue map returned that do not include the additional criteria; and in response to removing any issue maps from the at least one issue map returned that do not include the additional criteria, updating the chart based on the filtering input.

In one aspect, in combination with any example above or below, when providing a structures maintenance mapper, the filtering input specifies one of: a client identifier for whom a service record was created; a time range in which the service record was created; and an issue type for which the service record was created.

In one aspect, in combination with any example above or below, when providing a structures maintenance mapper, the high-level selection specifies a range of locations.

In one aspect, in combination with any example above or below, when providing a structures maintenance mapper, the high-level selection specifies a component identifier.

In a further aspect, the present disclosure provides a system for a structures maintenance mapper, comprising: a processor; and a non-transitory storage device, including instructions that when executed by the processor enable the system to: receive a definition for a complex system, including a coordinate system for the complex system; cluster terms in natural language service records of a corpus of natural language service records related to the complex system based on term definitions in a knowledgebase; associate the clustered terms with the coordinate system for the complex system based on the definition for the complex system; associate an issue map to a given natural language service record of the corpus, wherein the issue map identifies the clustered terms in the given natural language service record and associated locations for the clustered terms according to the coordinate system for the complex system; receive a new service request; parse the new service request for requested terms; query the corpus based on the requested terms; and return at least one natural language service record of the corpus having an issue map that specifies at least one location of the complex system correlated to the at least one of the requested terms.

In one aspect, in combination with any example above or below, the system is further configured to: display in a user interface an image of the complex system; receive a selection of a portion of the complex system; determine the requested terms based on the selection; and wherein querying the corpus based on the requested terms is done in response to determining the requested terms.

In one aspect, in combination with any example above or below, a graphical user interface is used to return the at least one natural language service record of the corpus as a chart of terms having identified locations in the issue map that overlays an image of the complex system at corresponding locations.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

Figure 1:
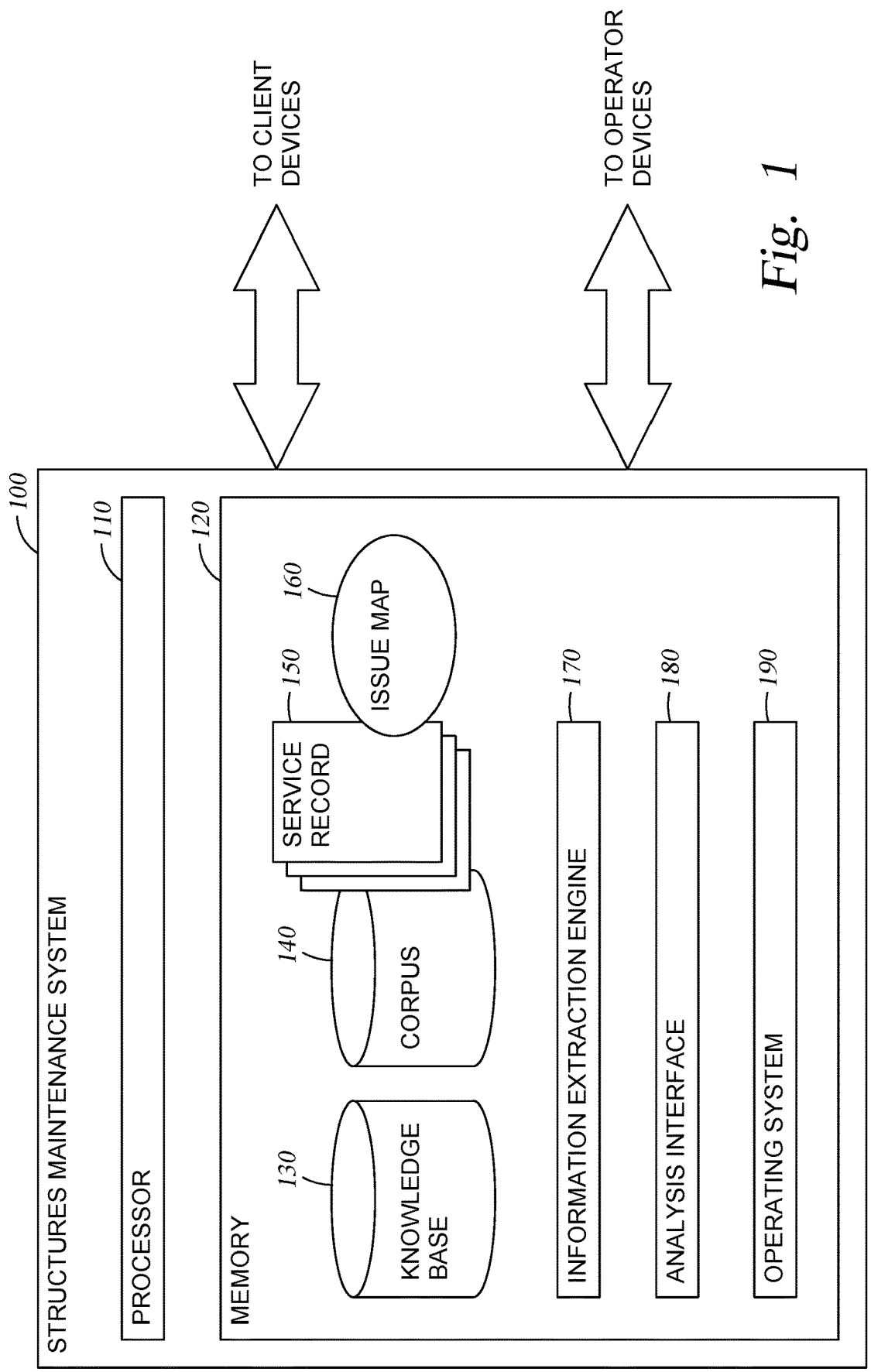
FIG. 1 illustrates an example architecture of a structures maintenance system.

Manufacturers and service providers are dealing with increasingly large sets of service records and other data relating to the lifecycle of complex systems (e.g., aircraft, ships, factories). Frequently, these service records include natural language text, which due to the size of the corpus of data records and the difficulty in generating an optimal search query for finding data relating to a specific issue with a specific complex system or grouping of such systems, conventional computer-based searching solutions are insufficient to address the needs of complex system manufacturers and service providers.

Finding and presenting related service records is increasingly important, as solutions to a given issue may have been described in prior service records, or the service records may indicate a trend in issues affecting a given part of the complex system. Complicating the analysis of the natural language text is the variation found in natural language. For example, a first customer may describe an issue as a "gouge" at a given component, and a second customer may describe the identical issue as "score" or "scratch" at a given location where the component resides. Although queries of the service records may be made using synonyms, each query must individually account for variations in how the underlying systems are described, as conventional technical solutions do not allow for aggregate analysis and require repeated queries to repeatedly expend computing resources to account for differences in terminology.

The present disclosure relates to systems and methods for enabling a computing system to search and interact with service records containing natural language text to aid in the analysis of those records. The processing efficiency of the computing device is improved, and fewer computing resources are expended in the analysis of the service records when the present disclosure is applied. By parsing the natural language text in service records for terms, and normalizing those terms according to a knowledgebase, a computing device can correlate those terms to a coordinate space for a complex system for which service is sought. These normalized terms and correlated locations are stored with the service records as an issue map so that subsequent queries, for individual records or aggregate records, can quickly and efficiently return results for analysis.

Although several examples are given in the present disclosure of a complex system being a particular complex systems, such as an aircraft, one of ordinary skill in the art will appreciate that other complex systems (e.g., automobiles, ships, factories, rockets, buildings, bridges) are also considered for the purposes of the present disclosure. Similarly, although several examples are given in the present disclosure of the natural language text being supplied in email messages, it will be appreciated that documents having sections of natural language text include, but are not limited to: text messages, in-application messages, voice transcriptions, word processing documents, and the like.

Turning now to FIG. 1, an example architecture of a structures maintenance system 100 is provided. The structures maintenance system 100 is a computing device, which includes a processor 110 and a memory 120. The processor 110 retrieves and executes programming instructions stored in the memory 120 as well as stores and retrieves application data residing in the memory 120. A bus is used to transmit programming instructions and application data between processor 110, memory 120, I/O devices, and a network interface (not shown) to communicate with client devices and operator devices. Client devices are computing devices used by third-parties who operate or maintain the entities for which service requests are generated, and the operator devices are computing devices used by parties who respond to the service requests (which may be the same parties who maintain the structured maintenance system 100).

The processor 110 generally represents any piece of computer hardware that is capable of processing information such as, for example, data, computer programs and/or other suitable electronic information. The processor 110 is composed of a collection of electronic circuits some of which may be packaged as an integrated circuit or multiple interconnected integrated circuits (an integrated circuit at times more commonly referred to as a "chip"). The processor 110 is configured to execute computer programs, which may be stored onboard the processor or otherwise stored in the memory 120 (of the same or another apparatus). The processor 110 may represent a number of processors, a multi-processor core or some other type of processor, depending on the particular implementation. Further, the processor 110 may be implemented using a number of heterogeneous processor systems in which a main processor is present with one or more secondary processors on a single chip. As another illustrative example, the processor 110 may be a symmetric multi-processor system containing multiple processors of the same type. In yet another example, the processor 110 may be embodied as or otherwise include one or more application-specific integrated circuits (ASICs), field-programmable gate arrays (FPGAs) or the like. Thus, although the processor 110 may be capable of executing a computer program to perform one or more functions, the processor of various examples may be capable of performing one or more functions without the aid of a computer program The memory 120 generally represents any piece of computer hardware that is capable of storing information such as, for example, data, computer programs (e.g., computer-readable program code) and/or other suitable information either on a temporary basis and/or a permanent basis. The memory 120 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), digital versatile disk (DVD), or the like. Although shown as a single unit, memory 120 may be a combination of fixed and/or removable storage devices, such as fixed disc drives, removable memory cards, or optical storage, network attached storage (NAS), or a storage area-network (SAN). Additionally, although shown as a component of the structured maintenance system 100, the memory may also include computer hardware disposed of remotely from the structured maintenance system, such as, for example, external hard drives, networked storage, distributed systems and databases, cloud storage, and the like.

In various instances, the memory 120 may be referred to as a computer-readable storage medium. The computer-readable storage medium is a non-transitory device capable of storing information, and is distinguishable from computer-readable transmission media, such as electronic transitory signals capable of carrying information from one location to another. Computer-readable medium as described herein may generally refer to a computer-readable storage medium or computer-readable transmission medium.

In addition to the memory 120, the processor 110 may also be connected to one or more interfaces for displaying, transmitting and/or receiving information. The interfaces may include a communications interface (e.g., communications unit) and/or one or more user interfaces one example of which may be a network interface. The network interface may be configured to transmit and/or receive information, such as to and/or from another apparatus(es), network(s) or the like. The network interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some aspects, the user interfaces are omitted and/or the visual and audio output from the structured maintenance system 100 is communicated to the client devices and/or the operator devices for consumption.

The memory 120 contains a knowledgebase 130, a corpus 140 made of a plurality of service records 150 and the associated issue maps 160, information extraction engine 170, an analysis interface 180, and an operating system 190. Generally, the operating system 190 represents software that is configured to manage computing hardware and software resources on the structured maintenance system 100. The operating system 190 may further provide computing services for software applications executing on the structured maintenance system 100.

A knowledgebase 130 identifies the terms and associations between terms, locations associated with terms, and terms associated with locations that may be found in the service records. The terms include, but are not limited to:

component names, part numbers, client identifiers, operator identifiers, complex system identifiers, issue identifiers, and location identifiers. The associations include known synonyms, acronyms, locations for components, components at locations, locations according to a first coordinate system based on a second coordinate system, alternative names, negators (e.g., "not", "no", "none"), implicit definitions (e.g., pronouns, "through", "from X to Y"). The knowledgebase 130 may be curated by operators who are subject matter experts (SME) to add or remove terms and associations, or by a machine learning process that is evaluated by SMEs to automatically add or remove terms and associations. The information extraction engine 170 uses the knowledgebase 130 to identify terms in the service records 150 to build the issue map 160 for those service records 150.

An individual service record 150 includes an initial service request received from a client (e.g., via a client device) and the intermediary communications made in response to the service request (e.g., via client devices and operator devices). Each communication in the service record includes natural language text, but each communication may also include structured data, metadata, and non-textual data. For example, an email communication within the service record 150 may include the natural language text from a client or operator regarding an issue that is formatted or marked as natural language text, such as, for example the contents of the Subject and Body fields of an email may be called out via structured data tags in HTML (e.g., <subject>X</subject> and <body>Y</body>). Additional formatting may also be included in the natural language text, such as, for example, tags indicating a font style or typeface to apply to the natural language text (e.g., "bold", "italic", "Arial", "size 12", "heading 1"). Additionally, documents including natural language text may also include various metadata or non-textual data, such as a time of transmission or an image attachment.

Several communications may be included in a service record 150, and a service record 150 will grow as communications are sent between clients and operators. These communications may be stored together in or linked together across one or more corpuses 140, which are repositories of service records 150. In some aspects, a corpus 140 may contain all or a subset of the service records 150. In one example, a first corpus 140 contains service records 150 from year X to year Y, and a second corpus 140 contains service records 150 from year Y to year Z. In a second example, a first corpus 140 contains service records 150 for a first client, and a second corpus 140 contains service records 150 for a second client. In a third example, a first corpus 140 contains service records 150 for a first complex system (e.g., aircraft of model A, building A), and a second corpus 140 contains service records 150 for a second complex system (e.g., aircraft of model B, building B). As will be appreciated, a corpus 140 may be divided into sub-corpuses by various terms or identifiers found in the service records 150, who the communications are received from or received by, when the communications are received, whether the service record 150 is designated as unacknowledged/in-progress/resolved, and combinations thereof.

The communications within a service record 150 are parsed by an information extraction engine 170 in combination with the knowledgebase 130 to identify terms within the natural language text that are used for analysis of the corpus 140 and thereby build an issue map 160 for each given service record 150. Because the communications include natural language text, the precise terminology used in a given communication may vary from another communication, even within a single service record 150. For example, a client may refer to a given component as "part X", while the operator may refer to the same component as "part Y", or the client may refer to the same issue across communications as various synonyms (e.g., a gouge, scratch, scar). The information extraction engine 170, therefore, clusters various terms found in the communications into normalized terms found in the knowledgebase 130. For example, instances of gouge/scratch/scar may be clustered into a normalized term such as "surface damage", or instances of lightning/hail/thunderstorm may be clustered into a normalized term such as "storm damage".

Clustering also expands terms into implicit components and implicit location terms that are referenced, but not directly named in the natural language text. In one example, when a client specifies in the natural language text "from beam 1 through beam 6", the information extraction engine 170 clusters beams 1, 2, 3, 4, 5, and 6, as beams 2-5 are implicitly referenced (i.e., are implicit location terms) based on the natural language of "from beam 1 through beam 6". In another example, the information extraction engine 170 clusters pronouns, in or across sentences, to refer to various terms that are explicitly referenced elsewhere, such as in the natural language text: "The surface damage is extensive. It runs from point A to point Z", where 'It' implicitly refers to the 'surface damage'.

The information extraction engine 170 may also access a hierarchical relationship list for the complex system that identifies parent components and child components within the complex system. As will be appreciated, the complex system may be treated as the "root" in the hierarchical relationship list from which all other components and assemblies thereof depend from. In one example, when a client specifies in the natural language text: "the landing gear assembly", the information extraction engine 170 clusters the sub-components of the landing gear (e.g., wheel axles, shock struts, tires) with the referenced 'landing gear assembly' as implicit components based on the hierarchical relationship list. In a second example, the information extraction engine 170 clusters supra-components or assemblies identified in the hierarchical relationship list that include the explicitly referenced component, such as when a wheel axle, shock strut, or tire is referenced, that term is clustered with a landing gear assembly to which the explicitly reference component belongs.

The clustering operations performed by the information extraction engine 170 also use the sentence and paragraph structures of natural language text to determine which explicitly referenced terms to ignore. For example, if a communication were to state "component X has not been damaged", the information extraction engine 170 determines that the negating terms "not" is used in reference to component X, and can ignore that reference to component X, potentially excluding component X from the issue map 160.

Additionally, because structural elements of the complex system may be referenced as part of the request for service as either components affected by the issue or as reference points to other components, the information extraction engine 170 uses the sentence and paragraph structure of natural language text to determine which explicit component references should be treated as locational references. For example, a client may reference "surface damage running from window 5 to window 9, one foot above the waterline" in which "window 5 to window 8" will be treated as location references that indicate where the surface damage runs longitudinally instead of references that windows 5-9 are affected by the "surface damage."

The issue map 160 is generated from the clustered terms identified in a service record 150 as being relevant to the service request. As will be appreciated, an individual service record 150 progresses (e.g., as further communications are exchanged), that service record 150 is updated with new information. For example, as a client and operator seek to find a resolution to an issue, several potential solutions or root causes may be proposed that are later found to be unrelated to the ultimate solution or actual root cause. The information extraction engine 170 therefore analyzes the service record 150 in order of earliest to most recent communications. The issue map 160 initially generated includes terms found in the initial service request, and the implicitly referenced terms, but as the analysis of the service record 150 progresses, the information extraction engine 170 places greater or lesser weight on terms based on the position of the terms in the service record 150. Various machine learning techniques may be employed by the information extraction engine 170 to determine whether to include a new term or keep an existing term, that are monitored by SMEs for accuracy.

The issue maps 160 are associated with the service records 150 from which the issue maps 160 are generated to provide the analysis interface 180 with a searchable body of data. In various aspects, the service records 150 that are not yet resolved mark the associated issue maps 160 as non-searchable until such time that the service record 150 is marked as resolved. The analysis interface 180 accepts queries for service records 150 having certain characteristics (e.g., related to client X, referencing issue Y, and/or referencing component Z) and returns aggregated metrics related to those service records 150 and/or links to access those service records 150. For example, a user interface (examples of which are discussed in greater detail in regards to FIGS. 4A and 4B) may provide counts of various issues illustrated on an image of the effected complex system.

In some aspects, the issue maps 160 are stored in the corpus 140 with the service records 150 that the issue maps 160 are associated with. In other aspects, the issue maps 160 are stored separately from the service records 150, but are linked to the service records 150. By storing the issue maps 160 separately from the service records 150, computer security may be improved (e.g., via reduced access to the service records 150) and memory storage space requirements may be reduced compared to storing the issue maps 160 and service records 150 together. For example, service records 150 may be stored in archival and/or encrypted storage devices, but the associated issue maps 160 may be stored in actively assessable storage devices. It will be appreciated, however, that storing the issue maps 160 and service records 150 together, may provide faster access to linked service records 150 from the associated issue maps 160 than if the data were to be stored separately.

The user may specify the various criteria by which the analysis interface 180 is to search the issue maps 160 via a selection in a user interface, via text entry, or by submitting a service record 150 for use as a seed. For example, a user may make a high-level selection of a location on an image of the complex system, a filtering selection of a date range, issue type, client identifier, etc. in the user interface that will be used by the analysis interface 180 to return service records 150 (and metrics thereof) that have issue maps 160 associated therewith that include the selected criteria. In another example, a user may input various criteria as text, which are normalized according to the clusters defined in the knowledgebase 130 to search the issue maps 160 for matches. In a further example, a user may submit a service record 150 (resolved or unresolved) to search for service records 150 containing the same or similar terms in the respective issue maps 160.

The issue maps 160 provide the structured maintenance system 100 improvements in efficiency when searching a large corpus 140 of natural language text. By searching the issue maps 160 instead of the individual service records 150, multiple instances or repetitions of a term in a service record 150 are not reflected as multiple hits of a query, thus improving accuracy of the data, and using fewer processing resources. Additionally, by having the terms in the service records 150 normalized and collected (and cross-associated) in the issue maps 160 independent of queries thereon, the speed at which query results are returned to users in increased and the service records 150 can be left in an original format. Moreover, by storing the issue maps 160 in association with or linked to the related service records 150, fewer computations need to be transacted, further reducing the processing resources consumed.

Figure 2:
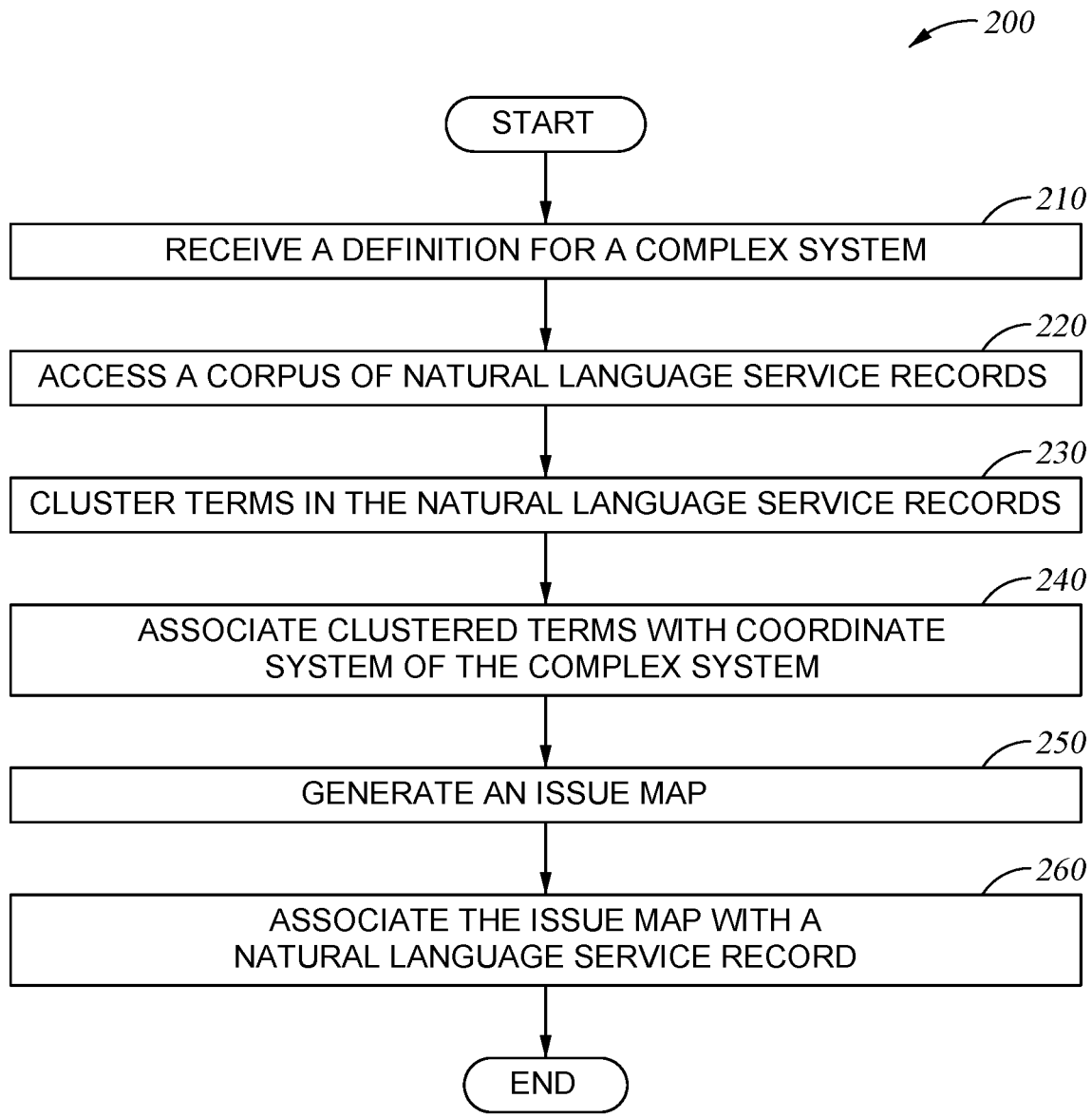
FIG. 2 is a flowchart showing general operations in an example method for structures maintenance mapping.

FIG. 2 is a flowchart showing general operations in an example method 200 for structured maintenance mapping. Method 200 begins at block 210, where a definition for a complex system is received. A complex system is an entity that is associated with at least one coordinate system for which service requests are made. In one example, several types of aircraft may have complex system definitions for each type that is associated with the stringers, waterlines, body buttock lines (also referred to as butt-lines), and body stations in the aircraft of that type. In another example, different classes of ships may have complex system definitions that use decks and bulkheads as a coordinate system.

At block 220 a corpus 140 of natural language service records 150 is accessed. In various aspects, the corpus 140 is selected (or filtered from a lager corpus 140) based on the complex system definition accessed in block 210. In other aspects, additional or different criteria are used to select the corpus 140, including a status of the service records 150 (e.g., resolved versus unresolved), when the service records 150 were received, who the service records 150 were received from/by, etc. The corpus 140 includes a plurality of service records 150 that include natural language text related to an issue for which service is sought.

Proceeding to block 230, the information extraction engine 170, with use of a knowledgebase 130, parses the natural language text to identify and cluster terms found in the natural language service records 150. The terms include the various names or identifiers for components of the complex system, locations in the complex system, issues identified for service, clients, operators, and dates. These terms are clustered into normalized forms, and expanded to include any implicit terminology according to relationships set in the knowledgebase 130. The knowledgebase 130 defines terminologies that are related to one another (e.g., synonyms, parent components, child components), known misspellings and typos for terminologies, and indicia of a term specifying additional implicit terminology, such as "through", "-", "both", 'all", etc. As will be understood, implicit terminology include internal terms related to a listed term, such as, for example, intermediated locations in a range of locations, sub-components of a listed component, super-components of a listed component, a parent company for a listed client, dates within a range, etc.

Additional to positive clustering, the information extraction engine 170 performs negative and referential clustering to remove mentions of terms that are not related to the issue for which service is requested. For example, the terms "not", "no", "none", and similar terms may be used in natural language to indicate that an indicated term is unaffected by the issue for which service is requested, and should be ignored by the information extraction engine. Similarly, terms such as "near", "under", "above", "next to", and the like may be used in natural language to indicate locations relative to a referenced component, but are not necessary intended to indicate that the referenced component is affected by the issue for which service is requested, and are treated as a location term by the information extraction engine 170. For example, a service request may indicate that surface damage occurred under an entry hatch, which the information extraction engine 170 interprets to determine a location were the surface damage occurred (i.e., "under" the entry hatch).

At block 240, the information extraction engine 170, with use of a knowledgebase 130 and a complex system definition, associates the clustered terms with the coordinate system for the complex system. This association is two-way for components and locations referenced in the communication. For example, a location listed in the communication is cross-referenced against components located at or around that location, and is associated with the listed location. In a second example, a component listed in the communication is cross-referenced against locations where that component is located in the complex system. In a third example, a component that is implicitly referenced, as a sub-component of a listed component, is associated with the location associated with the listed parent component. When more than one coordinate system is available in the complex system definition, each of the coordinate systems are associated with the clustered terms from the service records 150.

Proceeding to block 250, the issue maps 160 are generated for the natural language service records 150. Each issue map 160 is associated with one service record 150 and includes the terms found in that service record 150, including terms implicitly referenced and explicitly referenced. In service records 150 that are determined to include negated terms, such terms may be removed from the issue map 160, or included as negated terms for later reference. The terms are listed in the issue map 160 in association with any locations on the complex system associated with the term. For example a term for a client (e.g., "Acme, Inc.") is stored in the issue map 160 without reference to a location on the complex system, but a term for a component affect by the issue for which service is requested (e.g., "fuselage skin") is stored in the issue map 160 with reference to a location on the complex system. Similarly, in some aspects, a term for a location found in the service record 150 is stored with reference to components at that location. In aspects that use multiple coordinate systems for the complex system, terms are stored in the issue map 160 with associations to each of the coordinate systems available for describing the location of that term as part of the complex system.

At block 260, the issue map 160 is associated with the given service record 150 of the corpus 140. The issue maps 160 for all of the service records 150 in the corpus 140 are searchable by operators with access to the corpus 140 by any of the terms stored in the issue maps 160. When queried, the issue maps 160 provide links to the associated service record 150 (e.g., for user analysis of the natural language text) and counts of the various terms found therein (e.g., for analysis of frequency of components, locations, and/or types of issues.)

Method 200 may then conclude or repeat as new communications that are part of new or existing service records are received (updating the issue maps 160).

Figure 3:
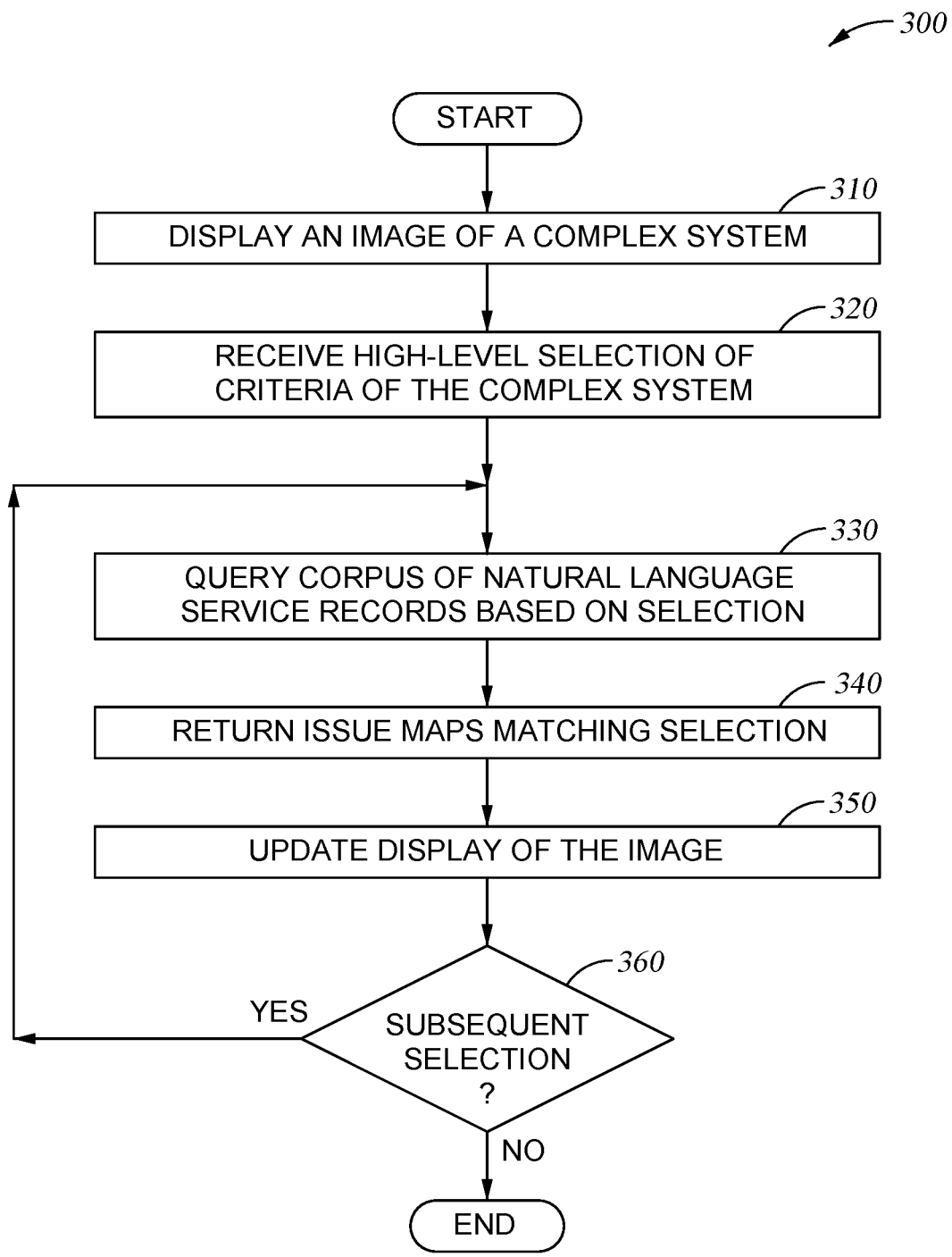
FIG. 3 is a flowchart showing general operations in an example method for structures maintenance mapping.

FIG. 3 is a flowchart showing general operations in an example method 300 for structured maintenance mapping. Method 300 begins with block 310, where an image of a complex system is displayed in a user interface. In various aspects, one or more images of the complex system are presented in different views, such as images of a frontal view and a lateral view of the complex system, or as an isometric view of the complex system. Each image of the complex system is associated with at least one coordinate system for the complex system so that metrics associated with various locations according to the coordinate system can be displayed in association with the image for visual analysis.

Proceeding to block 320, a high-level selection of a criterion or criteria related to the complex system is received. In some aspects, the high-level selection includes a location selected from the displayed image; a range of locations selected from the displayed image; a location or range of locations selected via text input; a client, a service record age range, a component, and issue type, or complex system age range, selected from a user interface control (e.g., a drop down menu); a client, a service record age range, a component, and issue type, or complex system age range, selected via text input; and various criteria selected to match according to criteria found in the issue map 160 of a chosen service record 150.

In various aspects, depending on how the requested terms are selected, the analysis interface 180 interprets the user's input to determine what the requested terms are. For example, a selection of a portion of an image of the complex system will cause the analysis interface 180 to determine locations indicated on the image and determine the terms for components and/or locations on the complex system that correspond to the selection of the image. In another example, the input of a text selection will cause the analysis interface 180 to cluster the input term to a normalized form, which can then be compared against the terms in the issue maps 160.

At block 330 the analysis interface 180 proceeds to query a corpus 140 of natural language service records 150 based on the selection(s) received from the user. The analysis interface 180 takes the criteria of terms and/or locations indicated in the selection(s) and locates issue maps 160 that contain the criteria indicated by the selection. The issue maps 160 matching the selection criteria are returned to the analysis interface 180 from the corpus 140 at block 340.

Proceeding to block 350, the analysis interface 180 compiles and displays metrics indicated in the returned issue maps 160 in association with the displayed images of the complex system. For example, a heat-map of the location of issues in the issue maps 160 is overlaid in association with a frame image of the complex system. In other aspects, bubble charts, three-dimensional bar charts, and other visualizations are used to indicate a number or frequency of issues occurring for a given term at a given location on the image. For terms that are not associated with a location on the complex system (e.g., the client having the issue with the complex system for which service is requested) visualization independent of the image, such as bar charts, pie charts, bubble charts, scatter plots, line charts, etc. are displayed in a user interface separately from the image of the complex system. Additionally, one or more links to download or otherwise view the natural language text of the associated service records 150 are displayed in the user interface.

Whether a subsequent selection has been made is determined at block 360. A subsequent selection may include selection of new query criteria or additional query criteria to refine or filter the results presented in response to the current or a prior query. In response to determining that a user has made a subsequent selection, method 300 returns to block 330 to further query to the corpus 140. In response to determining that a user has not made a subsequent selection, method 300 may then conclude or wait to repeat until such time as new queries are made of the issue map 160 of the corpus 140.

Figure 4A:
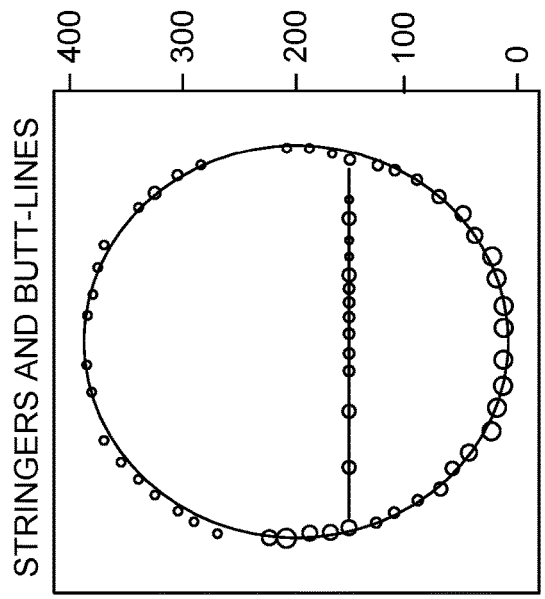
FIGS. 4A and 4B illustrate example graphical user interfaces for structures maintenance mapping.
Figure 4A:
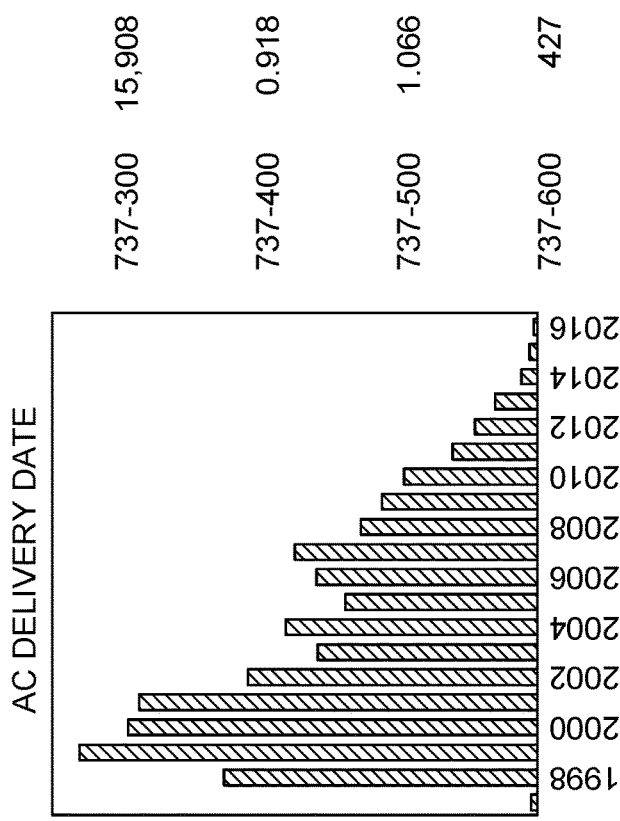
Figure 4A:
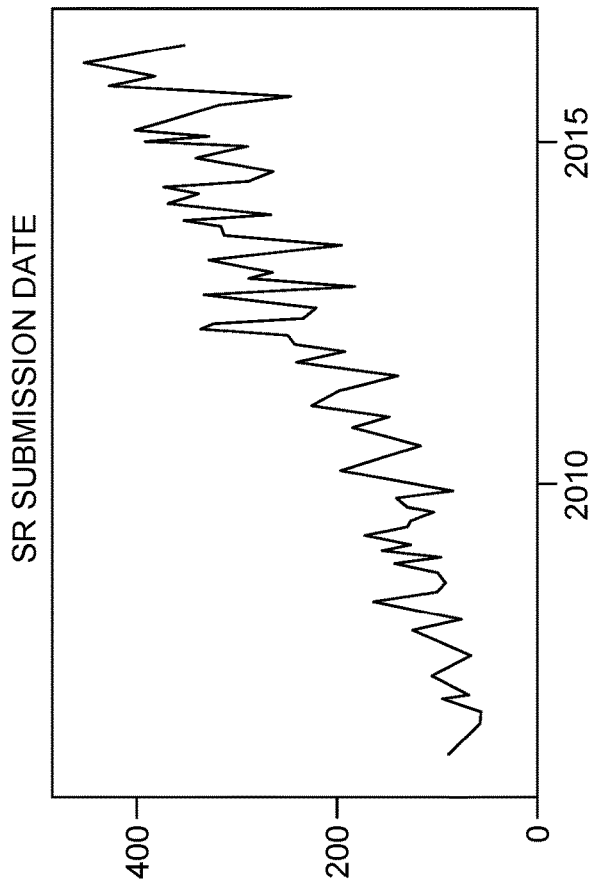
Figure 4B:
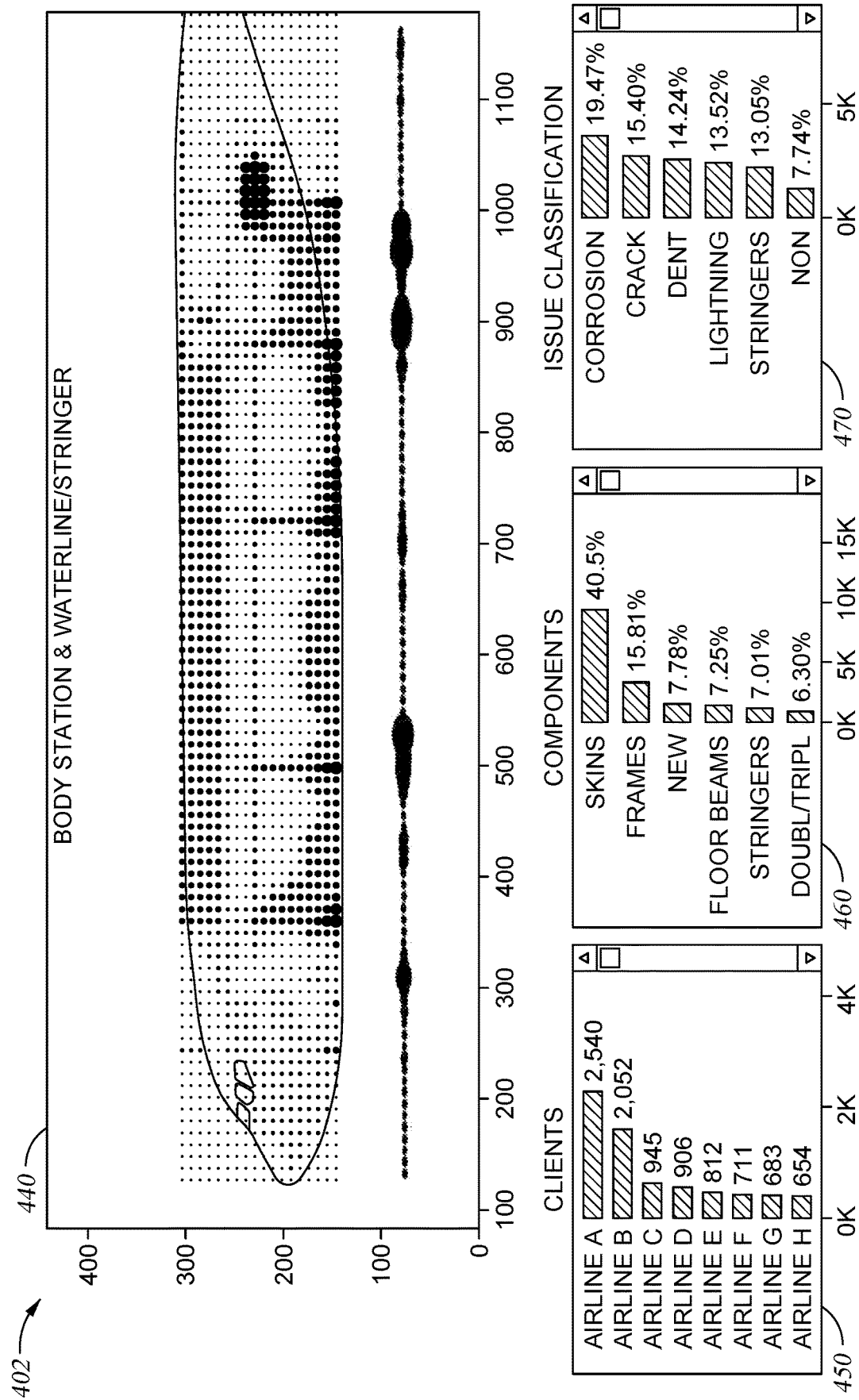

FIGS. 4A and 4B illustrate example graphical user interfaces (GUI) for structured maintenance mapping. Each of the GUI 401 and the GUI 402, illustrated in FIG. 4A and FIG. 4B respectively, may be displayed individually or in combination with one another depending on the screen space available for the user interface. It will therefore be appreciated that the illustrated examples are given for explanatory purposes only.

In the GUI 401 illustrated in FIG. 4A, a first image 410 of the complex system is displayed above a line chart 420 of service record submission frequency, and a first bar chart 430 of ages of the entities for which service records 150 have been submitted (at the time of submittal or at the time or at the time of analysis). In the GUI illustrated in FIG. 4B, a second image 440 of the complex system is displayed above a bar chart 450 of the numbers of clients who have submitted service requests, a bar chart 460 of the numbers of components implicated in service records 150, and a bar chart 470 of the numbers of issue types resulting in the service requests. It will be understood that the elements discussed as part of GUI 401 and GUI 402 may be displayed in different arrangements than that shown in the illustrated examples.

Each of the first image 410 and the second image 440 of the complex system are overlaid with data (in the form of bubbles belonging to bubble charts where the size of a bubble indicates the number of service requests linked to a particular location) indicating the issues determined to be at the displayed locations. The illustrated examples provide the first image 410 as a front-view of an aircraft, and the second image 440 as a side-view of the same aircraft. It will therefore be appreciated that the data overlaid on the images are the same data presented according to different coordinate systems associated with the various terms from returned issue maps 160. For example, the first image 410 presents data around the circular cross-section of the aircraft via stringer coordinates and presents those data across the width of the aircraft at various body buttock line coordinates. Those same data are again presented in the second image 440 against the width and height of the aircraft as waterline/stinger coordinates, and in relation to the length of the aircraft as body station coordinates.

As user is enabled by the analysis interface 180 to interact with the various display elements to further refine prior queries to the corpus 140, submit new queries to the corpus 140 (including queries for different entities), request prior queries to be re-run or re-presented, and to change the criteria used to analyze the data. In some aspects, the analysis interface 180 transmits results to an operator device to display the user interfaces as populated by the structured maintenance system 100, while in other aspects the analysis interface 180 transmits the data to the operator device to populate the user interfaces on the operator device. In some aspects the data transmitted to the operator device are the issue maps 160, which provide the benefit of reducing the bandwidth necessary to analyze the corpus 140 compared to transmitting the service records 150 to the operator device.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), an electronically erasable programmable memory (EEPROM) such as a flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, 3Radio Frequency (RF), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   displaying in a user interface an image of a complex system;
   receiving, from the user interface, a high-level selection of criteria of the complex system;
   querying issue maps associated with individual natural language service records of a corpus of natural language service records based on the high-level selection, wherein the issue maps specify at least one term related to the complex system and a location on the complex system associated with the at least one term; and
   returning at least one issue map, wherein the at least one issue map returned specifies a term or location correlated to the criteria of the complex system indicated by the high-level selection by:
      overlaying a chart onto the image of the complex system in a first coordinate system, wherein the image of the complex system is associated with the first coordinate system, and wherein the chart is overlaid onto the image of the complex system according to the first coordinate system;
      displaying a second image of the complex system associated with a second coordinate system, where the second coordinate system is correlated with the first coordinate system; and
      overlaying a second chart onto the second image of the complex system, wherein the second chart displays data in the at least one issue map at locations correlated to the second image of the complex system according to the second coordinate system.

2. The method of claim 1,
   wherein the chart displays data in the at least one issue map at locations correlated to the image of the complex system.

3. The method of claim 2, wherein the at least one issue map includes locations correlated the complex system in the first coordinate system and in a second coordinate system correlated with the first coordinate system.

4. The method of claim 2, further comprising:
   receiving a filtering input specifying additional criteria;
   removing any issue maps from the at least one issue map returned that do not include the additional criteria; and
   updating the chart based on the filtering input, in response to removing any issue maps from the at least one issue map returned that do not include the additional criteria.

5. The method of claim 4, wherein the filtering input specifies one of:
   a client identifier for whom a service record was created;
   a time range in which the service record was created; and
   an issue type for which the service record was created.

6. The method of claim 1, wherein the high-level selection specifies a range of locations.

7. The method of claim 1, wherein the high-level selection specifies a component identifier.

8. A non-transitory computer-readable storage medium comprising computer-executable instructions that, when executed by a processor, cause the processor to perform operations comprising:
   displaying in a user interface an image of a complex system;
   receiving, from the user interface, a high-level selection of criteria of the complex system;
   querying issue maps associated with individual natural language service records of a corpus of natural language service records based on the high-level selection, wherein the issue maps specify at least one term related to the complex system and a location on the complex system associated with the at least one term; and
   returning at least one issue map, wherein the at least one issue map returned specifies a term or location correlated to the criteria of the complex system indicated by the high-level selection by:
      overlaying a chart onto the image of the complex system in a first coordinate system, wherein the image of the complex system is associated with the first coordinate system, and wherein the chart is overlaid onto the image of the complex system according to the first coordinate system;
      displaying a second image of the complex system associated with a second coordinate system, where the second coordinate system is correlated with the first coordinate system; and
      overlaying a second chart onto the second image of the complex system, wherein the second chart displays data in the at least one issue map at locations correlated to the second image of the complex system according to the second coordinate system.

9. The non-transitory computer-readable storage medium of claim 8,
   wherein the chart displays data in the at least one issue map at locations correlated to the image of the complex system.

10. The non-transitory computer-readable storage medium of claim 9, wherein the at least one issue map includes locations correlated the complex system in the first coordinate system and in a second coordinate system correlated with the first coordinate system.

11. The non-transitory computer-readable storage medium of claim 9, further comprising:
receiving a filtering input specifying additional criteria;
removing any issue maps from the at least one issue map returned that do not include the additional criteria; and
updating the chart based on the filtering input, in response to removing any issue maps from the at least one issue map returned that do not include the additional criteria.

12. The non-transitory computer-readable storage medium of claim 11, wherein the filtering input specifies one of:
a client identifier for whom a service record was created;
a time range in which the service record was created; and
an issue type for which the service record was created.

13. A system, comprising:
a processor; and
a non-transitory storage device, including instructions that when executed by the processor enable the system to:
display in a user interface an image of a complex system;
receive, from the user interface, a high-level selection of criteria of the complex system;
query issue maps associated with individual natural language service records of a corpus of natural language service records based on the high-level selection, wherein the issue maps specify at least one term related to the complex system and a location on the complex system associated with the at least one term; and
return at least one issue map, wherein the at least one issue map returned specifies a term or location correlated to the criteria of the complex system indicated by the high-level selection by:
overlaying a chart onto the image of the complex system in a first coordinate system, wherein the image of the complex system is associated with the first coordinate system, and wherein the chart is overlaid onto the image of the complex system according to the first coordinate system;
displaying a second image of the complex system associated with a second coordinate system, where the second coordinate system is correlated with the first coordinate system; and
overlaying a second chart onto the second image of the complex system, wherein the second chart displays data in the at least one issue map at locations correlated to the second image of the complex system according to the second coordinate system.

14. The system of claim 13, wherein the chart displays data in the at least one issue map at locations correlated to the image of the complex system.

15. The system of claim 14, wherein the at least one issue map includes locations correlated the complex system in the first coordinate system and in a second coordinate system correlated with the first coordinate system.

16. The system of claim 14, wherein the instructions, when executed by the processor, further enable the system to:
receive a filtering input specifying additional criteria;
remove any issue maps from the at least one issue map returned that do not include the additional criteria; and
update the chart based on the filtering input, in response to removing any issue maps from the at least one issue map returned that do not include the additional criteria.

17. The system of claim 16, wherein the filtering input specifies one of:
a client identifier for whom a service record was created;
a time range in which the service record was created; and
an issue type for which the service record was created.

* * * * *